United States Patent Office 3,413,256
Patented Nov. 26, 1968

3,413,256
HOT MELT INKS AND METHOD OF USING SAID INKS
Richard Bolstad, Bronx, N.Y., and Michael J. Tinghitella, Wayne, N.J., assignors to Interchemical Corporation, New York, N.Y., a corporation of Ohio
No Drawing. Filed Oct. 8, 1965, Ser. No. 494,251
4 Claims. (Cl. 260—33.8)

ABSTRACT OF THE DISCLOSURE

A novel hot melt printing ink composition comprising a pigment dispersed in a vehicle comprising a blend of an epoxy resin in para-dichlorobenzene.

---

This invention relates to hot melt inks, particularly hot melt inks suitable for printing on glass.

In recent years, especially with the rise in the use of "non-returntable" bottles for many consumer beverages, the demand for inks for printing on glass has been steadily increasing. What is needed is an inexpensive ink having good adhesion to glass. The ink must dry rapidly after application in order to facilitate handling of the glass receptacles during production of the same.

We have found that epoxy resins, particularly solid or semi-solid epoxy resins formed by the reaction of 2,2-diphenol propane and epichlorohydrin display very good adhesion to glass. We have further found that by dissolving or blending such epoxy resins with paradichlorobenzene at elevated temperatures of about 150° F., we produce an ink vehicle which sets rapidly, within 2 to 3 seconds, upon being brought into contact with a surface such as glass at room temperature to provide printing having excellent adhesion to the glass surface. The paradichlorobenzene sublimes from the printed ink leaving primarily the epoxy resin and the dispersed pigment used in the printing.

For many applications, the epoxy resin in the applied composition need not be cross-linked. However, for more durable printing on the bottle, it is preferable that the composition further contain a conventional curing agent for cross-linking the epoxy resin. Among conventional curing agents are amines such as ethylenediamine, diethylenetriamine, piperidine and dimethylaminomethylphenol. Most preferably, the amine is dicyandiamide. The curing is preferably at 350° to 400° F. for about 20 to 30 minutes.

The epoxy resins or polyepoxides used in this invention are resins produced by the reaction of a polyhydric phenol, particularly 2,2-diphenol propane with epichlorohydrin in accordance with the procedure of U.S. Patent 2,633,458. By regulating the proportions of the two reactants, the molecular size and molecular structure of the polyepoxide resins may be controlled. By using an excess of epichlorohydrin, a low molecular weight polyepoxide resin may be produced. By increasing the amount of 2,2-diphenol propane, a higher weight polyepoxide resin may be produced. The epoxy resins should preferably have a molecular weight of at least 710. The polyepoxide resins produced by the reaction of epichlorohydrin and 2,2-diphenol propane may in addition be esterified with vegetable oil fatty acids including coconut acids, cottonseed acids, dehydrated castor fatty acids, linseed oil fatty acids, oiticia fatty acids, soy acids and tung fatty acids.

Preferably from 0.5 to 1.0 part of paradichlorobenzene is used for each part of epoxy resin.

The pigment which may be any conventional pigment may preferably constitute from 5 to 50% of the total ink weight.

The amine curing agent preferably constitutes from 0.5 to 25% of the weight of the epoxy resin.

Unless otherwise indicated, all proportions in this specification and claims are by weight.

The following examples will illustrate the practice of this invention:

Example 1

The following ingredients are blended at 150° F.:

| | Parts by weight |
|---|---|
| Epon 1007 (an epoxy resin formed by the reaction of 2,2-diphenol propane and epichlorohydrin having an average molecule weight of 2625 and an epoxide equivalent weight of 1550–2000) | 29.1 |
| Paradichlorobenzene | 40.0 |
| $TiO_2$ pigment | 29.1 |
| Dicyandiamide | 1.8 |

The composition maintained at 150° F. is applied to glass surface at 70° F. through a stenciled screen. Within 2 to 3 seconds, the applied ink dries to a hard tack-free state. The resulting ink shows good adhesion to glass. The printed ink is then cured by heating at 350 to 400° F. for 30 minutes. The resulting printed ink is tough, hard, abrasion resistant, and remains resistant and tough even after four hours immersion in water, 45 minutes immersion in water at 150° F., 40 minutes immersion in 4.5% solution of sodium hydroxide at 160° F. or 1 hour in an autoclave at 15 p.s.i.g. steam pressure. The printed ink is also resistant to 95% ethanol.

Example 2

The following ingredients are blended at 150° F.

| | Parts by weight |
|---|---|
| Epon 836 (an epoxy resin formed by the reaction of 2,2-diphenol propane and epichlorohydrin having an average molecular weight of 710 and an epoxide equivalent weight of from 290–335) | 22.7 |
| $TiO_2$ pigment | 27.3 |
| Paradichlorobenzene | 50.0 |

The composition maintained at 150° F. is applied to a glass surface at 70° F. through a stenciled screen. The applied ink dries within 2 to 3 seconds. The resulting printing shows good adhesion to glass.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

We claim:
1. An ink consisting essentially of a dispersion of pigment in a vehicle consisting essentially of the composition from 0.5 to 1.0 part by weight of paradichlorobenzene per part by weight of an epoxy resin produced by the reaction of 2,2-diphenol propane and epichlorohydrin having an average molecular weight of at least 710.

2. The ink of claim 1 wherein said epoxy resin has an average molecular weight of about 2900.

3. The ink of claim 1, further including from .005 to 0.25 parts by weight of an amine curing agent per part by weight of the epoxy resin.

4. The ink of claim 3 wherein said amine is dicyandiamide.

References Cited

UNITED STATES PATENTS

| | | |
|---|---|---|
| 2,361,740 | 10/1944 | Boggs. |
| 3,006,877 | 10/1961 | Herzberg. |
| 3,285,802 | 11/1966 | Smith. |
| 2,736,719 | 2/1956 | Stockmeyer. |

MORRIS LIEBMAN, *Primary Examiner.*

JULIUS FROME, *Assistant Examiner.*